(12) United States Patent
Kosugi et al.

(10) Patent No.: US 12,307,983 B2
(45) Date of Patent: May 20, 2025

(54) INFORMATION PROCESSING APPARATUS AND CONTROL METHOD

(71) Applicant: Lenovo (Singapore) Pte. Ltd., Singapore (SG)

(72) Inventors: Kazuhiro Kosugi, Kanagawa (JP); Masashi Nishio, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/412,755

(22) Filed: Jan. 15, 2024

(65) Prior Publication Data
US 2024/0249689 A1   Jul. 25, 2024

(30) Foreign Application Priority Data
Jan. 24, 2023   (JP) ................. 2023-008715

(51) Int. Cl.
*G09G 3/34* (2006.01)
*G06V 40/16* (2022.01)

(52) U.S. Cl.
CPC ......... *G09G 3/3406* (2013.01); *G06V 40/161* (2022.01); *G09G 2320/0626* (2013.01)

(58) Field of Classification Search
CPC ......... G09G 3/3406; G09G 2320/0626; G06V 40/161
See application file for complete search history.

(56) References Cited

U.S. PATENT DOCUMENTS

| | | | |
|---|---|---|---|
| 10,928,904 B1 * | 2/2021 | Novelli | G06F 3/013 |
| 11,367,306 B1 * | 6/2022 | Kuo | G06V 40/23 |
| 2009/0226095 A1 * | 9/2009 | Usui | G06V 40/161 |
| | | | 382/295 |
| 2011/0228117 A1 * | 9/2011 | Inoue | G06V 40/161 |
| | | | 348/222.1 |
| 2019/0037125 A1 * | 1/2019 | Jiang | G03B 15/03 |
| 2021/0327394 A1 * | 10/2021 | Bui | G06F 3/012 |

(Continued)

FOREIGN PATENT DOCUMENTS

| | | |
|---|---|---|
| JP | 2005276230 A | 10/2005 |
| JP | 2006344100 A | 12/2006 |

(Continued)

*Primary Examiner* — Md Saiful A Siddiqui
(74) *Attorney, Agent, or Firm* — Osha Bergman Watanabe & Burton LLP

(57) ABSTRACT

An information processing apparatus includes a ranging sensor which divides a predetermined detection range into a plurality of measurement units to measure the distance to an object for each measurement unit; a memory which temporarily stores distance information indicative of the distance for each measurement unit measured by the ranging sensor; and a processor which executes processing based on the distance information for each measurement unit. The processor detects a range of a person present in the detection range based on the distance information for each measurement unit, detects a range of a face of the person in the range of the person detected in the detection range based on the distance information for each measurement unit, and detects the orientation of the face based on distance information in the range of the face among pieces of the distance information each piece for each measurement unit.

7 Claims, 9 Drawing Sheets

(56) References Cited

U.S. PATENT DOCUMENTS

| | | | |
|---|---|---|---|
| 2022/0067346 A1* | 3/2022 | Yang | G06V 40/166 |
| 2022/0206567 A1* | 6/2022 | Zou | G06F 3/0304 |
| 2023/0196836 A1* | 6/2023 | Malpani | G06V 40/172 |
| | | | 382/103 |

FOREIGN PATENT DOCUMENTS

| | | |
|---|---|---|
| JP | 2013019721 A | 1/2013 |
| JP | 2016148895 A | 8/2016 |
| JP | 2018173707 A | 11/2018 |
| WO | 2012046392 A1 | 4/2012 |

\* cited by examiner

ORIENTATION OF FACE (HORIZONTAL DIRECTION)

ORIENTATION OF BODY (HORIZONTAL DIRECTION)

INFORMATION PROCESSING APPARATUS AND CONTROL METHOD

CROSS-REFERENCE TO RELATED APPLICATIONS

This application claims priority to Japanese Patent Application No. 2023-008715 filed on Jan. 24, 2023, the contents of which are hereby incorporated herein by reference in their entirety.

BACKGROUND OF THE INVENTION

Field of the Invention

The present invention relates to an information processing apparatus and a control method.

Description of the Related Art

There is an apparatus which makes a transition to a usable state when a person approaches or to a standby state in which functions except some of the functions are stopped when the person moves away. For example, in Japanese Unexamined Patent Application Publication No. 2016-148895, it is detected whether a person is approaching or has moved away using an infrared sensor.

In recent years, with the development of computer vision and the like, detection accuracy when detecting a face from a captured image captured by a camera has been getting higher. Therefore, person detection by face detection is also performed instead of person detection by the infrared sensor. In the person detection by face detection, since the orientation of a face can also be detected in addition to simply detecting a person, control according to the orientation of the face (facing forward, facing sideways, or the like) can also be performed. For example, when the face is turned to the side, the screen brightness is controlled to be reduced or turned off to prevent power from being wastefully consumed during a period when a user is not using the apparatus.

However, in the detection of the orientation of a face by face detection, the load of development related to image recognition and the like for face detection is high, and power consumption is also high because it is necessary to capture images using a camera. Therefore, a method capable of detecting the orientation of a face with a simple configuration is desired.

The present invention provides an information processing apparatus and a control method capable of detecting the orientation of a face with a simple configuration.

SUMMARY OF THE INVENTION

An information processing apparatus according to the first aspect of the present invention includes: a ranging sensor which divides a predetermined detection range into a plurality of measurement units to measure the distance to an object for each of the measurement units; a memory which temporarily stores distance information indicative of the distance for each of the measurement units measured by the ranging sensor; and a processor which executes processing based on the distance information for each of the measurement units, wherein the processor performs person detection processing to detect a range of a person present in the detection range based on the distance information for each of the measurement units, face range detection processing to detect a range of a face of the person in the range of the person detected in the detection range based on the distance information for each of the measurement units, and face direction detection processing to detect the orientation of the face based on distance information in the range of the face among pieces of the distance information each piece for each measurement unit.

The above information processing apparatus may be such that, in the face direction detection processing, the processor detects the orientation of the face based on differences among pieces of the distance information each piece for each of a plurality of measurement units in the range of the face.

The above information processing apparatus may also be such that, in the face direction detection processing, the processor detects the orientation of the face in a horizontal direction corresponding to a direction of rotation with a vertical axis passing through the center of the face as a central axis, and the orientation of the face in a vertical direction corresponding to a direction of rotation with a horizontal axis passing through the center of the face as the central axis.

The above information processing apparatus may further be such that, in the person detection processing, the processor calculates an average distance to the person based on distance information in the range of the person detected in the detection range among pieces of the distance information each piece for each measurement unit, and in the face direction detection processing, the processor detects the orientation of the face based on the average distance calculated by the person detection processing and pieces of the distance information each piece for each measurement unit in the range of the face.

Further, the above information processing apparatus may be such that, in the person detection processing, the processor calculates an average distance to the person based on distance information in the range of the person detected in the detection range among pieces of the distance information each piece for each measurement unit, and the processor controls whether or not to execute the face direction detection processing based on the average distance calculated by the person detection processing.

Further, the above information processing apparatus may be such that, in the face range detection processing, the processor detects the range of the face of the person based on the shape of an edge of the range of the person detected in the detection range.

Further, the above information processing apparatus may be such that the processor performs screen brightness control processing to control the screen brightness of a display unit based on the orientation of the face detected by the face direction detection processing.

Further, the above information processing apparatus may be such that the processor further performs body detection processing to detect a range of at least part of a body of the person in the range of the person detected in the detection range based on distance information for each measurement unit, and body direction detection processing to detect the orientation of the body based on distance information in the range of at least part of the body among the pieces of the distance information each piece for each measurement unit.

Further, the above information processing apparatus may be such that the processor performs screen brightness control processing to control the screen brightness of a display unit based on the orientation of the face detected by the face direction detection processing and the orientation of the body detected by the body direction detection processing.

Further, a control method according to the second aspect of the present invention is a control method for an information processing apparatus including: a ranging sensor which divides a predetermined detection range into a plurality of measurement units to measure the distance to an object for each of the measurement units; a memory which temporarily stores distance information indicative of the distance for each of the measurement units measured by the ranging sensor; and a processor which executes processing based on the distance information for each measurement unit, the control method including: a person detection step of causing the processor to detect a range of a person present in the detection range based on the distance information for each measurement unit; a face detection step of causing the processor to detect a range of a face of the person in the range of the person detected in the detection range based on the distance information for each measurement unit; and a face direction detection step of causing the processor to detect the orientation of the face based on distance information in the range of the face among pieces of the distance information each piece for each measurement unit.

The above aspects of the present invention can detect the orientation of a face with a simple configuration.

DETAILED DESCRIPTION OF THE INVENTION

Embodiments of the present invention will be described below with reference to the accompanying drawings.

First Embodiment

First, an overview of an information processing apparatus 1 according to a first embodiment will be described.

[Overview]

Figure 1:
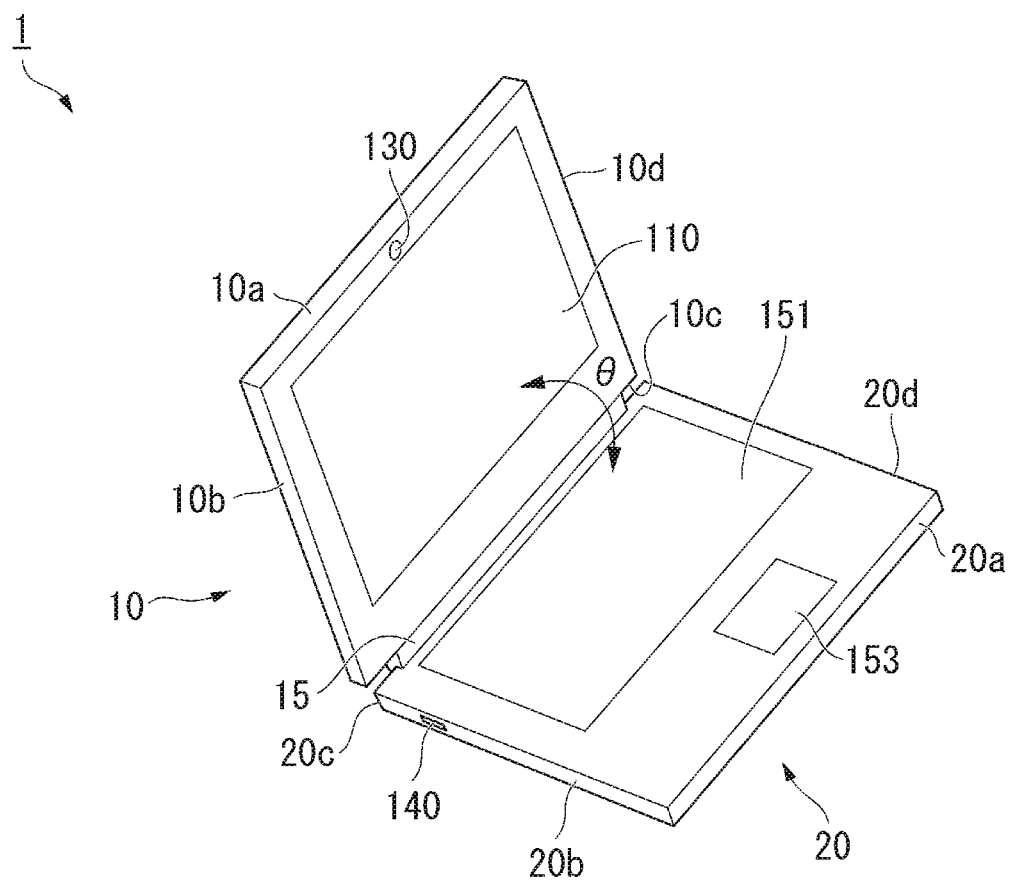
FIG. 1 is a perspective view illustrating a configuration example of the appearance of an information processing apparatus according to a first embodiment.

FIG. 1 is a perspective view illustrating a configuration example of the appearance of the information processing apparatus 1 according to the present embodiment. The information processing apparatus 1 is, for example, a laptop PC (Personal Computer).

The information processing apparatus 1 includes a first chassis 10, a second chassis 20, and a hinge mechanism 15. The first chassis 10 and the second chassis 20 are joined by using the hinge mechanism 15. The first chassis 10 is rotatable around the rotation axis of the hinge mechanism 15 relative to the second chassis 20. An open angle by the rotation between the first chassis 10 and the second chassis 20 is denoted by "θ" in FIG. 1.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." Further, when looking to the front from the information processing apparatus 1, the direction to the right is referred to as "right side," and the direction to the left is referred to as "left side." The side faces on the right side of the first chassis 10 and the second chassis 20 are referred to as side faces 10b and 20b, respectively, and the side faces on the left side are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the information processing apparatus 1 in FIG. 1 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when a user uses the information processing apparatus 1, and the information processing apparatus 1 is often used in a state where the open angle is typically about θ=100° to 130°. Note that the range of open angles θ to be the open state can be set arbitrarily according to the range of angles rotatable by the hinge mechanism 15, or the like.

A display unit 110 is provided on the inner face of the first chassis 10. The display unit 110 is configured to include a liquid crystal display (LCD) or an organic EL (Electro Luminescence) display, and the like. Further, a ToF sensor 130 is provided in a peripheral area of the display unit 110 on the inner face of the first chassis 10. For example, the ToF sensor 130 is arranged on the side of the side face 10a in the peripheral area of the display unit 110. Note that the position at which the ToF sensor 130 is arranged is just an example, and it may be elsewhere as long as the ToF sensor 130 can be directed in a direction facing a display screen of the display unit 110.

The ToF sensor 130 is a ranging sensor to measure the distance to an object (for example, a person) present in the direction facing the display screen of the display unit 110 (that is, in front of the information processing apparatus 1). For example, the ToF sensor 130 is configured to include a light-emitting part for emitting infrared light and a light-receiving part for receiving reflected light which is the infrared light returned after emitted and reflected on the surface of an object. The ToF sensor 130 emits infrared light forward in a predetermined sampling cycle (for example, 1 Hz) and receives the reflected light of the emitted infrared light to output a ranging signal according to the distance to the object (for example, the person) using a ToF method for converting, into a distance, a time difference from light emission to light reception.

Further, a power button 140 is provided on the side face 20b of the second chassis 20. The power button 140 is an operating element used by the user to give an instruction to power on or power off, make a transition from a standby state to a normal operating state, make a transition from the normal operating state to the standby state, or the like. The normal operating state is an operating state capable of executing processing without being particularly limited, which corresponds, for example, to S0 state defined in the ACPI (Advanced Configuration and Power Interface) specification.

The standby state is a state in which at least part of system processing is limited and power consumption is lower than that in the normal operating state. For example, the standby state may be the standby state or a sleep state, modern standby in Windows (registered trademark), or a state corresponding to S3 state (sleep state) defined in the ACPI specification. Further, a state in which at least the display of the display unit appears to be OFF (screen OFF), or a screen lock state may also be included as the standby state. The screen lock is a state in which an image preset to make a content being processed invisible (for example, an image for the screen lock) is displayed on the display unit, that is, an unusable state until the lock is released (for example, until the user is authenticated).

Further, a keyboard 151 and a touch pad 153 are provided on the inner face of the second chassis 20 as an input device to accept user operation input. Note that a touch sensor may also be provided as the input device instead of or in addition to the keyboard 151 and the touch pad 153, or a mouse and an external keyboard may be connected. When the touch sensor is provided, an area corresponding to the display screen of the display unit 110 may be constructed as a touch panel to accept operations. Further, a microphone used to input voice may be included in the input device.

Note that, in the closed state where the first chassis 10 and the second chassis 20 are closed, the display unit 110 provided on the inner face of the first chassis 10, and the keyboard 151 and the touch pad 153 provided on the inner face of the second chassis 20 are covered with each other's chassis faces, and put in a state of being disabled from fulfilling the functions.

The information processing apparatus 1 executes HPD (Human Presence Detection) processing to detect a person present in front of the information processing apparatus 1 based on a ranging signal output by the ToF sensor 130.

Figure 2:
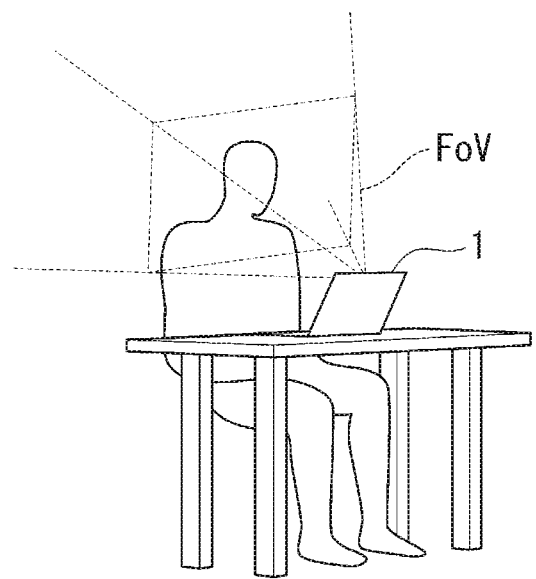
FIG. 2 is a diagram illustrating an example of a person detection range of the information processing apparatus according to the first embodiment.

FIG. 2 is a diagram illustrating an example of a distance-measuring range of the ToF sensor 130 according to the present embodiment. In the open state, the ToF sensor 130 arranged on the inner face of the first chassis 10 measures the distance to an object (for example, a person) in the direction (frontward) facing the inner face of the first chassis 10. This ToF sensor 130 is a ranging sensor for detecting a person (for example, the user) present in front, and a detection range to detect the person is called a detection range FoV (Field of View: detection viewing angle). The detection range FoV corresponds to a range of angles in which the ToF sensor 130 can measure the distance.

For example, the ToF sensor 130 divides the detection range FoV into measurement units of 8×8 squares to measure a distance in each square (for each measurement unit). Note that, since the purpose is to detect a person (user) who uses the information processing apparatus 1, the distance to an object more than a certain distance (for example, 1 m) away may be excluded from targets to be measured. Further, it is impossible to measure the distance to an object far away by a distance at which the infrared light cannot reach.

The information processing apparatus 1 controls the operating state of the system of the information processing apparatus 1 depending on the presence or absence of a person by the HPD processing. For example, when a person is present in front of the information processing apparatus 1, the information processing apparatus 1 controls the operating state to the normal operating state, while when no person is present in front of the information processing apparatus 1, the information processing apparatus 1 controls the operating state to the standby state.

Further, when the presence of a person in front of the information processing apparatus 1 is detected, the information processing apparatus 1 detects the orientation of a face of the person based on a ranging signal output by the ToF sensor 130. For example, the information processing apparatus 1 determines whether or not the face of the person is facing the direction of the information processing apparatus 1 (the direction of the display unit 110). Here, it is assumed that a state where the face of the person is facing the direction of the information processing apparatus 1 (the direction of the display unit 110) is a state where the face is facing forward.

For example, the information processing apparatus 1 controls the screen brightness of the display unit 110 (dimming control) depending on whether or not the orientation of the face is forward. Specifically, when the face is not facing forward, the information processing apparatus 1 reduces the screen brightness of the display unit 110 to save power. Further, when the face turned to the front again, the information processing apparatus 1 restores the screen brightness to the original screen brightness before being reduced.

In the following, the original screen brightness before being reduced is called "standard brightness." Further, the screen brightness reduced from the standard brightness when the face is not facing forward is called "low brightness." The low brightness is a brightness at least lower than the standard brightness, but as the brightness becomes lower, the effect of power saving increases. For example, the low brightness may be set to a brightness of about 0 to 10% of the standard brightness.

(Face Orientation Detection Method)

Next, a detection method of detecting the orientation of a face based on a ranging signal output from the ToF sensor 130 will be described. In the present embodiment, the information processing apparatus 1 detects the front, left, right, up, or down orientation as the orientation of a face. The left and right orientation is the orientation of the face in the horizontal direction corresponding to the direction of rotation with the vertical axis passing through the center of the face as the central axis. Further, the up and down orientation is the orientation of the face in the vertical direction corresponding to the direction of rotation with the horizontal axis passing through the center of the face as the central axis.

Figure 3:
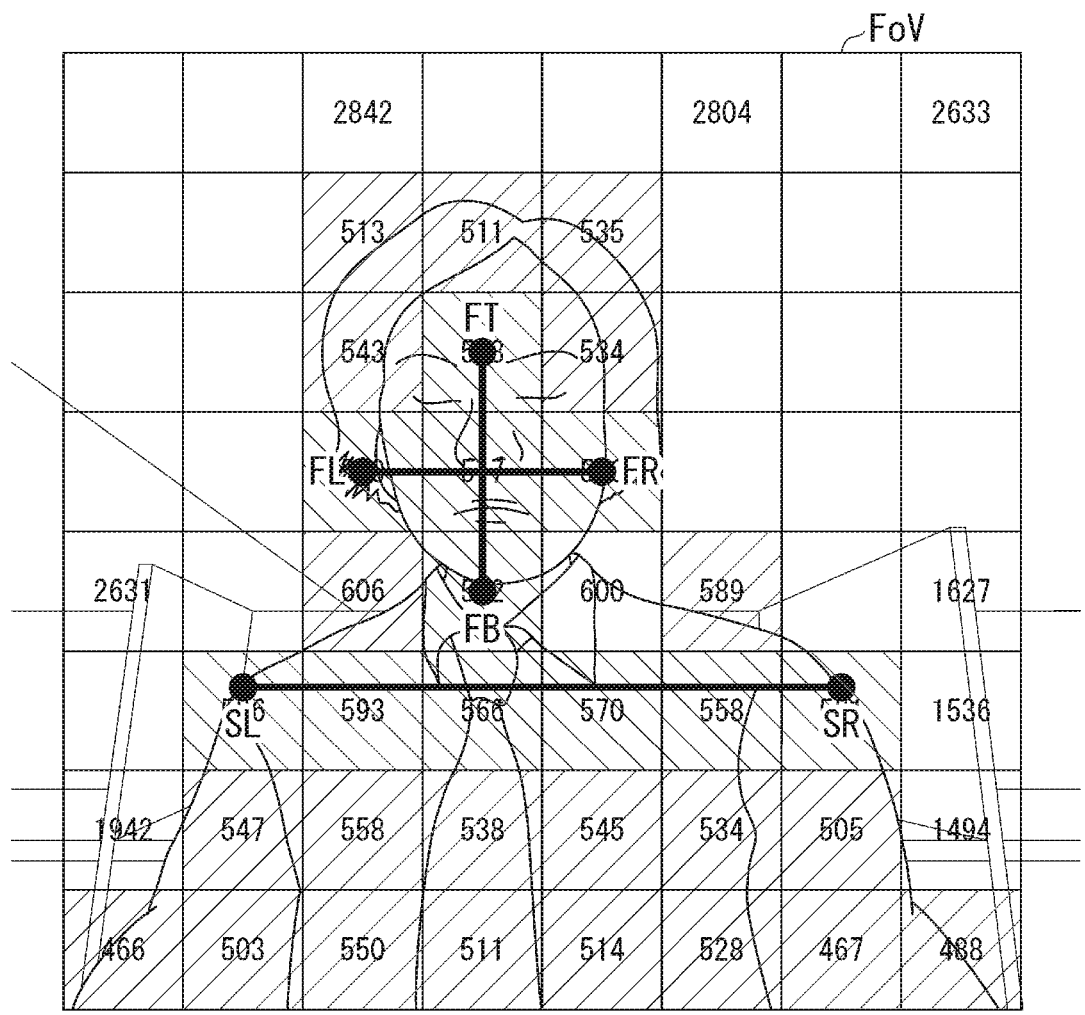
FIG. 3 is a diagram illustrating an example of transitions of the operating state and detection processing according to the first embodiment.

FIG. 3 is an explanatory diagram of the detection method of the orientation of a face according to the present embodiment. In this figure, the detection range FoV is divided into 64-square measurement units of 8×8 squares and an example of a measured distance value for each square (each unit) is numerically represented in each square. For example, the measured distance value in each square is a measured distance value measured by the ToF sensor 130 in each of predetermined cycles (for example, at one second intervals). Since any person moves to some extent, the measured distance value in each square is constantly changing. Therefore, measured distance values measured in the predetermined cycles (for example, at one second intervals) may be time-averaged to obtain a reliable measured distance value.

In this figure, the unit of measured distance value numerically represented in each square is millimeters. In the illustrated example, a range of squares with measured distance values of 450 to 610 is a range in which a person is present. Squares with measured distance values of 1000 or more are measured distance values of a ceiling or an object behind the person. Further, squares with no measured distance value represented are squares impossible to measure distances because objects are too far away.

A range of the person is characterized in that the range generally has a mountain-shaped edge, and the width of a part above the shoulders of a body is shorter than the shoulder width. For example, when the edge of a range of squares, in which measured distance values within 1 m (1000 mm) and with small differences thereamong (here, about 450 to 610) are obtained, becomes a mountain shape having the characteristics of a person, the information processing apparatus 1 detects the range as a range of a person (that is, detects that a person is present). In the illustrated example, six squares from a square marked with SL (Shoulder Left) to a square marked with SR (Shoulder Right) in the horizontal direction (the left and right direction) corresponds a shoulder range (shoulder width), and the width of a part above the shoulder range is shorter than the shoulder width.

Further, the information processing apparatus 1 detects, as a face range, a range above the shoulder range and narrower in the left and right width than the shoulder range. For example, the information processing apparatus 1 detects, as a face range, 3(horizontal)×4(vertical) squares above the shoulder range in the person range. The size of this face range corresponds to a range of the face of a person present at a distance and using the information processing apparatus 1 (performing keyboard operations) when distances are measured by dividing the detection range FoV into 8×8 squares.

Note that the information processing apparatus 1 may also detect, as the face range, 3×3 squares above the shoulder range in the person range. Further, when distances are measured in a measurement unit of the detection range FoV other than 8×8 squares, the face range is also set to a range according to the number of measurement units instead of 3×4 squares or 3×3 squares.

Further, as illustrated, it is assumed that the center square in the face range is the center of the face, and the measured distance value of a square marked with FT (Face Top) above the center square is a measured distance value of a top part of the face (forehead position). It is also assumed that the measured distance value of a square marked with FB (Face Bottom) below the center square is a measured distance value of a bottom part of the face (chin position). It is further assumed that the measured distance value of a square marked with FL (Face Left) on the left side of the center square is a measured distance value of a right part of the face. Further, it is assumed that the measured distance value of a square marked with FR (Face Right) on the right side of the center square is a measured distance value of a left part of the face.

Note that when the face range is composed of 3×3 squares, the center square in the face range is a center square of the 3×3 squares, while when the face range is composed of 3(horizontal)×4(vertical) squares, the center square is either a square in the center column and the second row or a square in the center column and the third row. Here, the lower square (the square in the third row) is prioritized as the center square.

Note that the upper square (the square in the second row) may also be prioritized as the center square. Further, the measured distance values in both of the squares may be tracked to prioritize, as the center square, a square smaller in measured distance value, or prioritize, as the center square, a square larger in the amount of variation (amount of movement) of the measured distance value.

The information processing apparatus 1 detects the orientation of the face based on the measured distance values in the top part, bottom part, left part, and right part of the face. For example, the information processing apparatus 1 determines the orientation of the face in the vertical direction (up and down direction) based on a difference between the measured distance value in the top part and the measured distance value in the bottom part of the face. Further, the information processing apparatus 1 determines the orientation of the face in the horizontal direction (left and right direction) based on a difference between the measured distance value in the left part and the measured distance value in the right part of the face.

For example, when the difference between the measured distance value in the top part and the measured distance value in the bottom part of the face is a predetermined threshold value or more, and the measured distance value in the top part is smaller than the measured distance value in the bottom part of the face, the information processing apparatus 1 determines that the orientation of the face is downward. On the other hand, when the difference between the measured distance value in the top part and the measured distance value in the bottom part of the face is the predetermined threshold value or more, and the measured distance value in the bottom part is smaller than the measured distance value in the top part, the information processing apparatus 1 determines that the orientation of the face is upward.

Further, when the difference between the measured distance value in the left part and the measured distance value in the right part of the face is the predetermined threshold value or more, and the measured distance value in the left part is smaller than the measured distance value in the right part, the information processing apparatus 1 determines that the orientation of the face is rightward. On the other hand, when the difference between the measured distance value in the left part and the measured distance value in the right part of the face is the predetermined threshold value or more, and the measured distance value in the right part is smaller than the measured distance value in the left part, the information processing apparatus 1 determines that the orientation of the face is leftward.

Further, when the difference between the measured distance value in the top part and the measured distance value in the bottom part of the face is less than the predetermined threshold value, and the difference between the measured distance value in the left part and the measured distance value in the right part of the face is less than the predetermined threshold value, the information processing apparatus 1 determines that the face is facing forward. Thus, the information processing apparatus 1 determines whether the orientation of the face is downward or upward, leftward or rightward, or forward based on the measured distance values in the top part, bottom part, left part, and right part of the face to detect the orientation of the face.

Note that the information processing apparatus 1 may also determine the orientation of the face in the vertical direction (up and down direction) and the horizontal direction (left and right direction) depending on in which part the measured distance value is the smallest among the top part, bottom part, left part, and right part of the face. Further, when the differences among the measured distance values in the top part, bottom part, left part, and right part of the face are less than the predetermined threshold value, the information processing apparatus 1 may determine that the face is facing forward.

[Hardware Configuration of Information Processing Apparatus]

Figure 4:
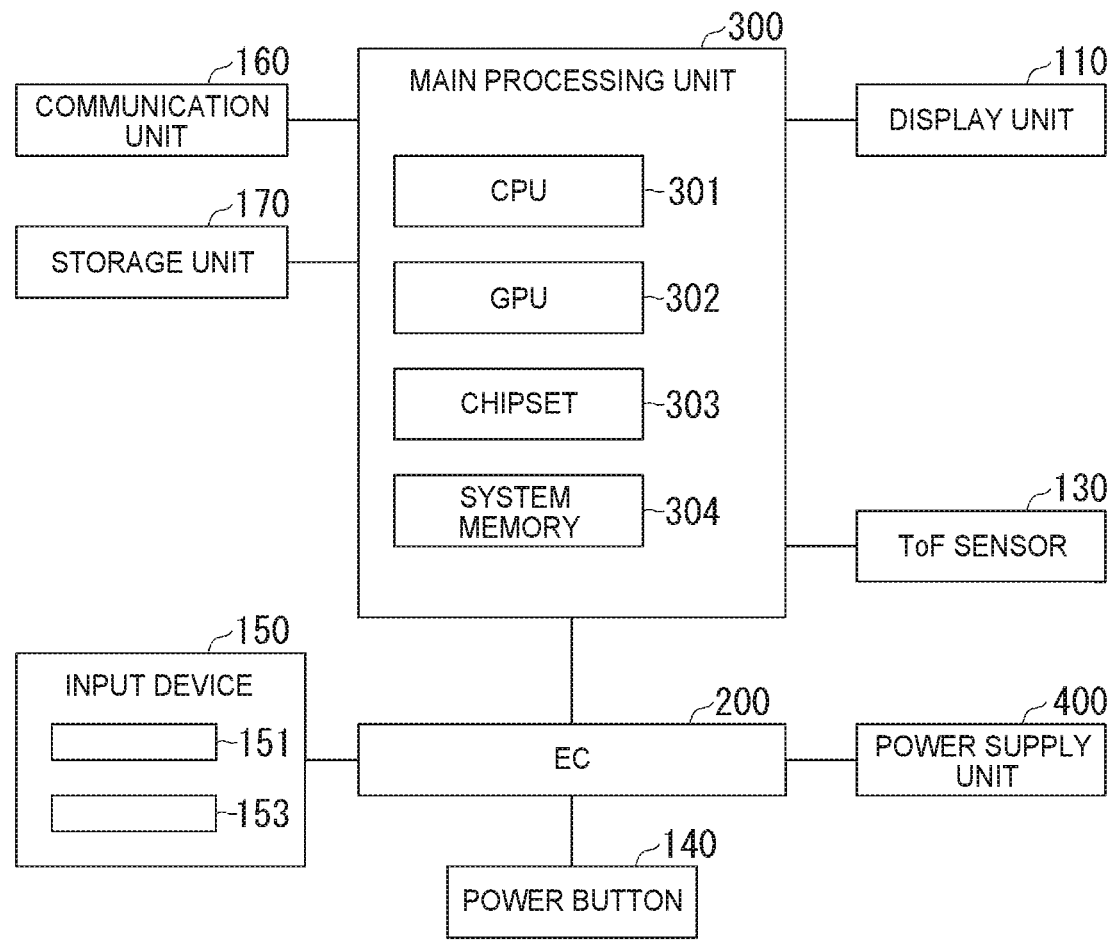
FIG. 4 is a schematic block diagram illustrating an example of the hardware configuration of the information processing apparatus according to the first embodiment.

FIG. 4 is a schematic block diagram illustrating an example of the hardware configuration of the information processing apparatus 1 according to the present embodiment. In FIG. 4, components corresponding to respective units in FIG. 1 are given the same reference numerals. The information processing apparatus 1 is configured to include the display unit 110, the ToF sensor 130, the power button 140, an input device 150, a communication unit 160, a storage unit 170, an EC (Embedded Controller) 200, a main processing unit 300, and a power supply unit 400.

The display unit 110 displays display data (images) generated based on system processing executed by the main processing unit 300, processing of application programs running on the system processing, and the like.

As described above, the ToF sensor 130 is a ranging sensor using a ToF method to measure the distance to an object (for example, a person) present in front. For example, the ToF sensor 130 outputs a ranging signal containing measured distance values obtained by measuring the distance to an object (for example, a person) present in the detection range FoV in the direction (frontward) facing the inner face of the first chassis 10.

The power button 140 outputs, to the EC 200, an operation signal according to a user operation. The input device 150 is an input unit for accepting user input, which is configured to include, for example, the keyboard 151 and the touch pad 153. In response to accepting operations on the keyboard 151 and the touch pad 153, the input device 150 outputs, to the EC 200, operation signals indicative of the operation details.

The communication unit 160 is connected to other devices communicably through a wireless or wired communication network to transmit and receive various data. For example, the communication unit 160 is configured to include a wired LAN interface such as Ethernet (registered trademark), a wireless LAN interface such as Wi-Fi (registered trademark), and the like.

The storage unit 170 is configured to include storage media, such as an HDD (Hard Disk Drive) or an SDD (Solid State Drive), a RAM, a ROM, and the like. The storage unit 170 stores the OS, device drivers, various programs such as applications, and various data acquired by the operation of the programs.

The power supply unit 400 supplies power to each unit according to the operating state of each unit of the information processing apparatus 1. The power supply unit 400 includes a DC (Direct Current)/DC converter. The DC/DC converter converts the voltage of DC power, supplied from an AC (Alternate Current)/DC adapter or a battery (battery pack), to a voltage required for each unit. The power with the voltage converted by the DC/DC converter is supplied to each unit through each power system. For example, the power supply unit 400 supplies power to each unit through each power system based on a control signal input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the own ROM, and executes the read control program to fulfill the functionality. The EC 200 operates independently of the main system processing unit 300 to control the operation of the main processing unit 300 and manage the operating state of the main processing unit 300. Further, the EC 200 is connected to the power button 140, the input device 150, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the information processing apparatus 1. Further, the EC 200 acquires operation signals from the power button 140 and the input device 150, and outputs, to the main processing unit 300, an operation signal related to processing of the main processing unit 300 among the acquired operation signals.

The main processing unit 300 is configured to include a CPU (Central Processing Unit) 301, a GPU (Graphic Processing Unit) 302, a chipset 303, and a system memory 304, where processing of various application programs is executable on the OS (Operating System) by system processing based on the OS.

The CPU 301 is a processor to execute processing based on a BIOS program, processing based on the OS program, processing based on application programs running on the OS, and the like. For example, the CPU 301 executes boot processing to boot the system from the standby state and make the transition to the normal operating state, sleep processing to make the transition from the normal operating state to the standby state, and the like. Further, the CPU 301 executes screen brightness control processing to control the screen brightness of the display unit 110 based on the detection result of the orientation of the face described above.

The GPU 302 is connected to the display unit 110. The GPU 302 executes image processing under the control of the CPU 301 to generate display data. The GPU 302 outputs the generated display data to the display unit 110.

The chipset 303 has a function as a memory controller, a function as an I/O controller, and the like. For example, the chipset 303 controls reading data from and writing data to the system memory 304, the storage unit 170, and the like by the CPU 301 and the GPU 302. Further, the chipset 303 controls input/output of data from the communication unit 160, the display unit 110, and the EC 200. Further, the chipset 303 has a function as a sensor hub. For example, the chipset 303 acquires ranging signals output from the ToF sensor 130, and the like.

The system memory 304 is used as a reading area of a program executed by the CPU 301 and a working area to write processed data.

Note that the CPU 301, the GPU 302, and the chipset 303 may also be integrated as one processor, or some or each of them may be configured as an individual processor, respectively. For example, in the normal operating state, the CPU 301, the GPU 302, and the chipset 303 are all operating, but in the standby state, only at least part of the chipset 303 is operating.

[Functional Configuration of Information Processing Apparatus]

Next, the functional configuration of the information processing apparatus 1 to detect the orientation of a face using the ToF sensor 130 will be described in detail.

Figure 5:
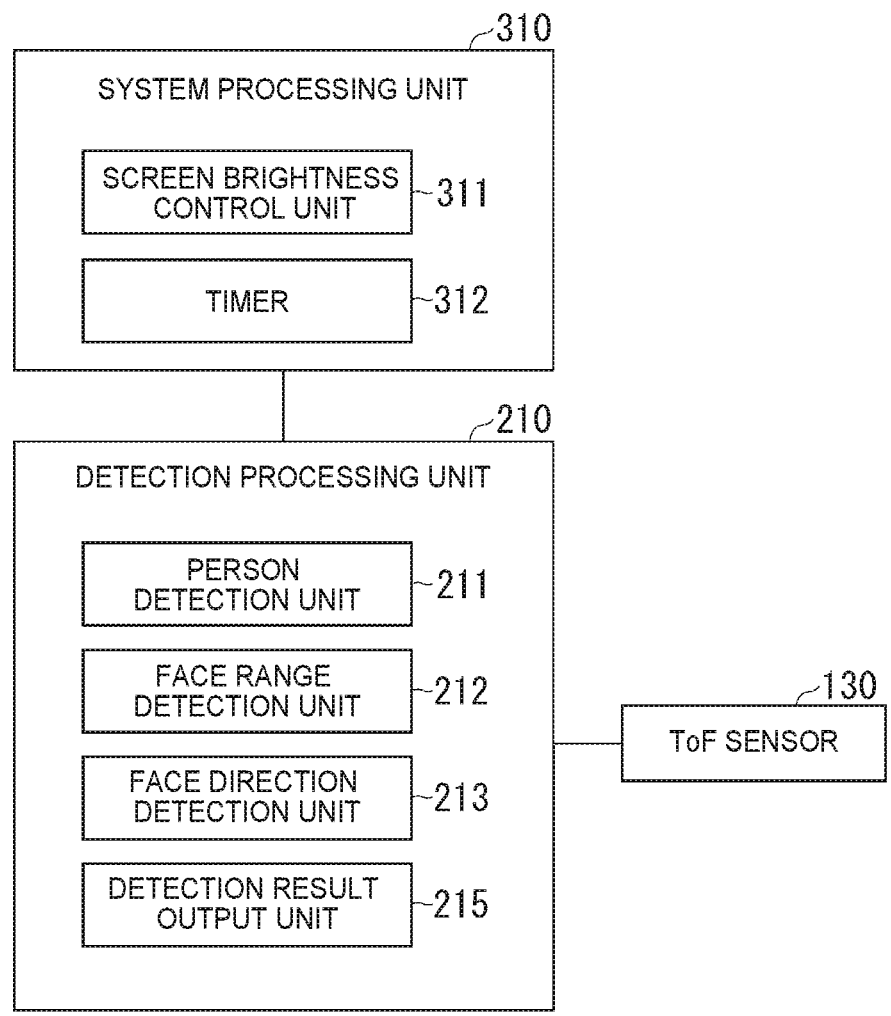
FIG. 5 is a schematic block diagram illustrating an example of the functional configuration of the information processing apparatus according to the first embodiment.

FIG. 5 is a schematic block diagram illustrating an example of the functional configuration of the information processing apparatus 1 according to the present embodiment. The information processing apparatus 1 includes a detection processing unit 210 that acquires a ranging signal measured by the ToF sensor 130 to detect a person and the orientation of a face of the person, and a system processing unit 310 that performs processing based on the detection results by the detection processing unit 210. The detection processing unit 210 includes a person detection unit 211, a face range detection unit 212, a face direction detection unit 213, and a detection result output unit 215 as functional components that performs the detection of a person and the detection of the orientation of a face described above by the CPU 301 or the chipset 303 executing a specific program.

The person detection unit 211 performs person detection processing to detect a person (a person range) present in the detection range FoV based on measured distance values in the detection range FoV measured by the ToF sensor 130. For example, as described with reference to FIG. 3, the person detection unit 211 acquires a measured distance value for each square (each measurement unit) obtained by dividing the detection range FoV into 64-square measurement units of 8×8 squares by a ranging signal output from the ToF sensor 130. Then, when the edge of a range of squares, in which measured distance values within 1 m (1000 mm) and with small differences thereamong (for example, about 450 to 610) are obtained, becomes a mountain shape having the characteristics of a person, the person detection unit 211 detects the range as a person range (that is, detects that a person is present).

Further, since any person moves to some extent, the person detection unit 211 may target, for detection, only a moving object (for example, with minute movement) with completely stationary objects excluded from detection targets when detecting a person (a person range). For example, the person detection unit 211 determines, from measured distance values measured in the predetermined cycles (for example, at one second intervals), whether or not the measured distance values are the measured distance values of a moving object based on the amount of variation of the measured distance value in each square to detect a person (a person range) based on the edge of a range of squares in which the measured distance values of the moving object are obtained.

The face range detection unit 212 performs face range detection processing to detect a face range of the person in the person range detected by the person detection unit 211. For example, the face range detection unit 212 detects the face range of the person based on the shape of the edge of the person range detected in the detection range FoV. Specifically, the face range detection unit 212 detects a shoulder range in the person range to detect, as the face range, a range of 3(horizontal)×4(vertical) squares or 3×3 squares above the shoulder range (see FIG. 3).

The face direction detection unit 213 performs face direction detection processing to detect the orientation of the face based on measured distance values in the face range detected by the face range detection unit 212. For example, the face direction detection unit 213 detects the orientation of the face based on differences among measured distance values respectively for plural squares (measurement units) in the face range. Specifically, as described with reference to FIG. 3, the face direction detection unit 213 determines the orientation of the face in the vertical direction (up and down direction), the orientation of the face in the horizontal direction (left and right direction), or whether or not the orientation of the face is forward based on the differences among the measured distance values in the top part, bottom part, left part, and right part of the face to detect the orientation of the face. For example, the face direction detection unit 213 detects the orientation of the face depending on which part in the face range is close based on the measured distance values respectively for the plural squares (measurement units) in the face range.

Note that the person detection unit 211 may calculate an average distance to the person based on the measured distance values in the person range. Then, the face direction detection unit 213 may take the average distance to the person into account when detecting the orientation of the face. For example, when calculating differences among the measured distance values respectively for the plural squares (measurement units) in the face range, the face direction detection unit 213 may perform detection using differences from the average distance to the person.

Further, the face direction detection unit 213 may control whether or not to execute the face direction detection processing based on the average distance to the person. For example, when the average distance to the person is less than a predetermined distance (for example, less than 30 cm) (that is, when the person is too close), the face direction detection unit 213 may not execute the face direction detection processing. Further, when the average distance to the person is a predetermined distance (for example, 1 m) or more (that is, when the person is too far), the face direction detection unit 213 may not execute the face direction detection processing. In other words, the face direction detection unit 213 may execute the face direction detection processing only when the person detected in the detection range FoV is present at a distance at which the person is likely to be the user or at a distance at which the orientation of the face is detectable.

The detection result output unit 215 outputs, to the system processing unit 310, information based on the orientation of the face detected by the face direction detection unit 213. For example, the detection result output unit 215 outputs, as the information based on the orientation of the face detected by the face direction detection unit 213, information indicating whether or not the orientation of the face is forward. As an example, the detection result output unit 215 outputs "Attention" information indicative of a state where the person is looking at (paying attention to) the information processing apparatus 1 to the system processing unit 310 as the information indicating that the orientation of the face is forward. On the other hand, as information indicating that the orientation of the face is not forward, the detection result output unit 215 outputs, to the system processing unit 310, "No Attention" information indicative of a state where the person is not looking at (not paying attention to) the information processing apparatus 1.

Note that the detection result output unit 215 may also output information indicative of the orientation of the face as the information based on the orientation of the face detected by the face direction detection unit 213. The information indicative of the orientation of the face is forward, upward, downward, leftward, rightward, or the like.

The system processing unit 310 is a functional component implemented by the CPU 301 executing programs of the BIOS and the OS. For example, the system processing unit 310 includes a screen brightness control unit 311 and a timer 312 as functional components implemented by executing the OS program.

The screen brightness control unit 311 controls the screen brightness of the display unit 110 based on the orientation of the face detected by the detection processing unit 210. For example, when the "No Attention" information is acquired from the detection processing unit 210 in the normal operating state, the screen brightness control unit 311 controls the screen brightness to the low brightness.

Further, when the "Attention" information is acquired from the detection processing unit 210 in the state where the screen brightness is controlled to the low brightness, the screen brightness control unit 311 restores the screen brightness to the standard brightness. In other words, when it is detected that the orientation of the face is forward by the detection processing unit 210 in the state where the screen brightness is reduced, the screen brightness control unit 311 restores the screen brightness to the standard brightness before being reduced.

The timer 312 is a timer for measuring a waiting time from the time when the "No Attention" information is acquired from the face detection unit 210 in the normal operating state until the screen brightness is controlled to the low brightness. When acquiring the "Attention" information before the elapse of a predetermined waiting time after the "No Attention" information is acquired, the screen brightness control unit 311 keeps the standard brightness without controlling the screen brightness to the low brightness. When not acquiring the "Attention" information during the predetermined waiting time after the "No Attention" information is acquired, the screen brightness control unit 311 controls the screen brightness to the low brightness. This makes it possible to prevent the screen brightness from being controlled to the low brightness when the user just looks away a little bit during using the information processing apparatus 1. The predetermined waiting time is preset, for example, to 10 seconds or the like. Note that this predetermined waiting time may also be settable by the user.

[Operation of Face Direction Detection Processing]

Figure 6:
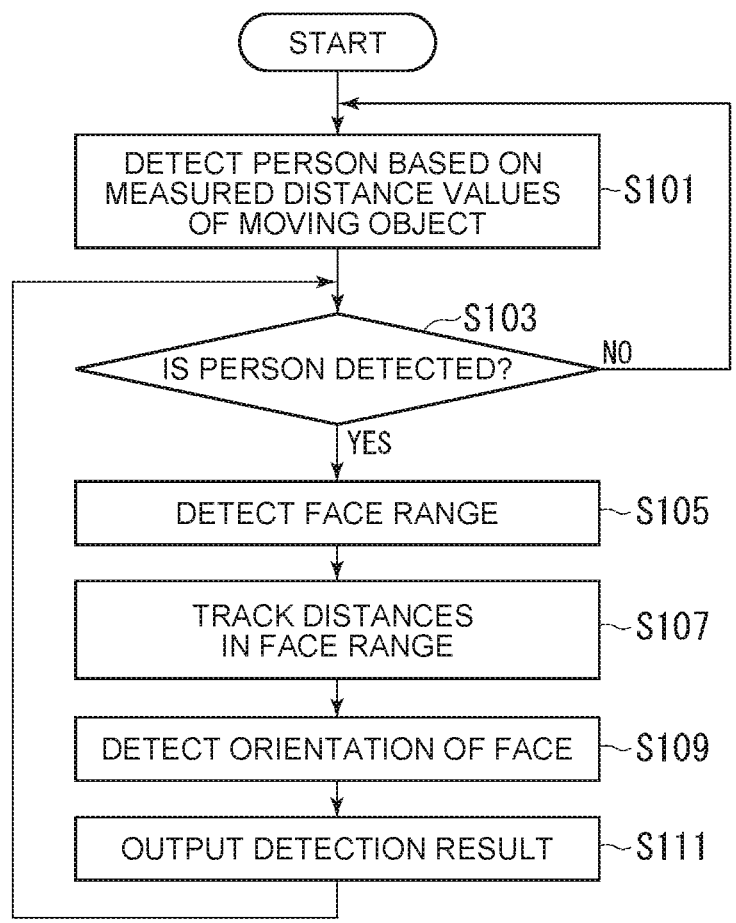
FIG. 6 is a flowchart illustrating an example of face direction detection processing according to the first embodiment.

Referring next to FIG. 6, the operation of face direction detection processing in which the information processing apparatus 1 detects the orientation of a face using the ToF sensor 130 will be described.

FIG. 6 is a flowchart illustrating an example of face direction detection processing according to the present embodiment.

(Step S101) The detection processing unit 210 acquires ranging signals output from the ToF sensor 130 in the predetermined cycles to perform person detection processing to detect a person (a person range) present in the detection range FoV based on the edge of a range of squares in which measured distance values of a moving object are obtained. Then, the detection processing unit 210 proceeds to a process in step 103.

(Step S103) The detection processing unit 210 determines whether or not a person (a person range) is detected in the person detection processing of step S101. When determining that no person (no person range) is detected (NO), the detection processing unit 210 continues the process in step S101 to continuously perform the person detection processing. On the other hand, when determining that a person (person range) is detected (YES), the detection processing unit 210 proceeds to a process in step S105.

(Step S105) The detection processing unit 210 performs face range detection processing to detect a range of a face of the person in the detected person range. For example, the detection processing unit 210 detects the range of the face of the person based on the edge of the range of the person detected in the detection range FoV. Specifically, the detection processing unit 210 detects a range of shoulders in the range of the person to detect, as a face range, a range of 3(horizontal)×4(vertical) squares or 3×3 squares above the range of shoulders (see FIG. 3). Then, the detection processing unit 210 proceeds to a process in step S107.

(Step S107) The detection processing unit 210 tracks distances in the detected face range to acquire measured distance values in the face range. Then, the detection processing unit 210 proceeds to a process in step S109.

(Step S109) The detection processing unit 210 performs face direction detection processing to detect the orientation of the face based on the measured distance values in the face range acquired in step S107. For example, the face direction detection unit 213 detects the orientation of the face based on differences among the measured distance values respectively for plural squares (measurement units) in the face range. Specifically, as described with reference to FIG. 3, the detection processing unit 210 determines the orientation of the face in the vertical direction (up and down direction), the orientation of the face in the horizontal direction (left and right direction), or whether or not the orientation of the face is forward based on the differences among the measured distance values in the top part, bottom part, left part and right part of the face to detect the orientation of the face. For example, the detection processing unit 210 detects the orientation of the face depending on which part in the face range is close based on the measured distance values respectively for plural squares (measurement units) in the face range. Then, the detection processing unit 210 proceeds to a process in step S111.

(Step S111) The detection processing unit 210 outputs information based on the orientation of the face detected in step S109 to the system processing unit 310 as the detection result. For example, when the detected orientation of the face is forward, the detection processing unit 210 outputs the "Attention" information to the system processing unit 310. On the other hand, when the detected orientation of the face is not forward, the detection processing unit 210 outputs the "No Attention" information to the system processing unit 310.

[Operation of Screen Brightness Control Processing]

Figure 7:
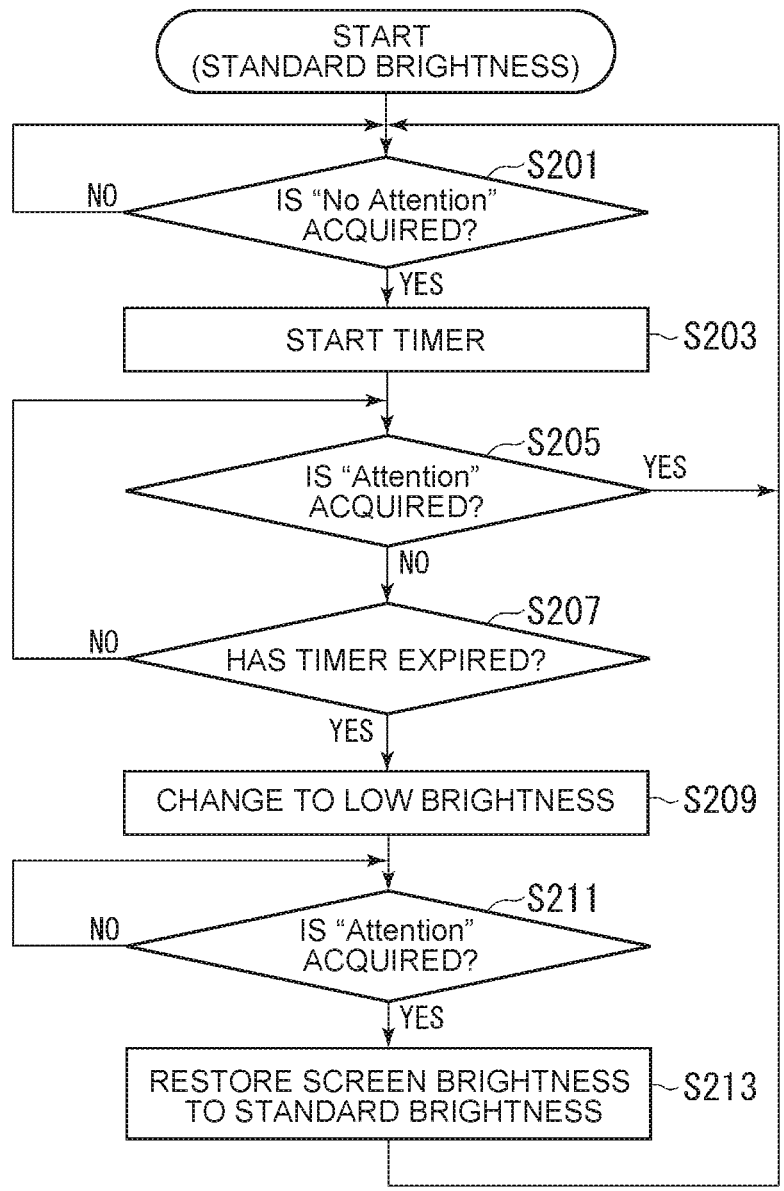
FIG. 7 is a flowchart illustrating an example of screen brightness control processing according to the first embodiment.

Referring next to FIG. 7, the operation of screen brightness control processing executed by the system processing unit 310 will be described. FIG. 7 is a flowchart illustrating an example of screen brightness control processing according to the present embodiment. Here, it is assumed that the information processing apparatus 1 is in such a state that the face of the user is facing forward in the normal operating state and the screen brightness is set to the standard brightness.

(Step S201) The screen brightness control unit 311 determines whether or not the "No Attention" information is acquired from the detection processing unit 210. When determining that the "No Attention" information is not acquired (NO), the screen brightness control unit 311 performs the process in step S201 again. On the other hand, when determining that the "No Attention" information is acquired (YES), the screen brightness control unit 311 starts measuring the waiting time using the timer 312 (step S203). Then, the screen brightness control unit 311 proceeds to a process in step S205.

(Step S205) The screen brightness control unit 311 determines whether or not the "Attention" information is acquired from the face detection unit 210. When determining that the Attention" information is not acquired (NO), the screen brightness control unit 311 proceeds to a process in step S207.

(Step S207) The screen brightness control unit 311 determines whether or not the predetermined waiting time (for example, 10 seconds) has elapsed based on the value of the timer 312 (that is, whether or not the timer has expired). When determining that the predetermined waiting time (for example, 10 seconds) has not elapsed (that is, that the timer has not expired) (NO in step S207), the screen brightness control unit 311 returns to the process in step S205. When determining that the "Attention" information is acquired before the elapse of the predetermined waiting time (for example, 10 seconds) (YES in step S205), the screen brightness control unit 311 returns to the process in step S201. At this time, the timer 312 is reset.

On the other hand, when determining in step S207 that the predetermined waiting time (for example, 10 seconds) has elapsed (YES in step S207), the screen brightness control unit 311 changes the screen brightness to the low brightness (step S209). Then, the screen brightness control unit 311 proceeds to a process in step S211.

(Step S211) The screen brightness control unit 311 determines whether or not the "Attention" information is acquired from the face detection unit 210. When determining that the "Attention" information is not acquired (NO), the screen brightness control unit 311 performs the process in step S211 again. On the other hand, when determining that the "Attention" information is acquired (YES), the screen brightness control unit 311 restores the screen brightness to the standard brightness (step S213).

Summary of Embodiment

As described above, the information processing apparatus 1 according to the present embodiment includes: the ToF sensor 130 (an example of a ranging sensor) which divides the detection range FoV (an example of a predetermined detection range) into multiple measurement units (for example, 8×8 squares illustrated in FIG. 3) to measure the distance to an object for each measurement unit; the system memory 304 (an example of a memory) which temporarily stores a measured distance value (an example of distance information) indicative of the distance for each measurement unit measured by the ToF sensor 130; and a processor (for example, the CPU 301, the chipset 303, or the like) which executes processing (for example, person detection processing, face range detection processing, and face direction detection processing) based on the measured distance value for each measurement unit. In the person detection processing, the information processing apparatus 1 detects a range of a person present in the detection range FoV based on the measured distance value for each measurement unit. Further, in the face range detection processing, the information processing apparatus 1 detects a range of a face of the person in the range of the person detected in the detection range FoV based on the measured distance value for each measurement unit. Further, in the face direction detection processing, the information processing apparatus 1 detects the orientation of the face based on measured distance values in the range of the face among the measured distance values each for each measurement unit.

Thus, since the information processing apparatus 1 detects the orientation of the face using the ToF sensor 130, the orientation of the face can be detected with a simple configuration. For example, in a conventional method of detecting the orientation of a face using a captured image captured by a camera, the load of development related to image recognition and the like for face detection is high, and power consumption is also high because it is necessary to capture images using the camera, while in the detection of the orientation of the face using the ToF sensor 130 according to the present embodiment, since the configuration is such a simple configuration as to perform detection by an algorithm using numerical processing of the measured distance values without the need to use the camera, the development cost can be reduced with low power consumption compared to the conventional method.

For example, in the face direction detection processing, the information processing apparatus 1 detects the orientation of the face based on differences among measured distance values for every plural measurement units (for example, the top part, bottom part, left part, and right part of the face) in the range of the face.

Thus, the information processing apparatus 1 can detect the orientation of the face using the fact that the distance to each part of the face changes depending on the orientation of the face.

Specifically, in the face direction detection processing, the information processing apparatus 1 detects the orientation of the face in the horizontal direction (left and right direction) corresponding to the direction of rotation with the vertical axis passing through the center of the face as the central axis, and the orientation of the face in the vertical direction (up and down direction) corresponding to the direction of rotation with the horizontal axis passing through the center of the face as the central axis.

Thus, the information processing apparatus 1 can detect whether the orientation of the face is leftward or rightward, upward or downward, or none of them (that is, forward).

Further, in the person detection processing, the information processing apparatus 1 calculates an average distance to the person based on the measured distance values in the range of the person detected in the detection range FoV among the measured distance values for every measurement units. Then, in the face direction detection processing, the information processing apparatus 1 detects the orientation of the face based on the average distance to the person calculated by the person detection processing and the measured distance values for every plural measurement units in the range of the face.

Thus, the information processing apparatus 1 can detect the orientation of the face accurately based on the distance to each part of the face based on the distance to the person (the position of the person).

Further, the information processing apparatus 1 controls whether or not to execute the face direction detection processing based on the average distance to the person calculated by the person detection processing.

Thus, when the person is present in a position in which the person is unlikely to use the information processing apparatus 1 (for example, in a position too far from the information processing apparatus 1) even though the person is present in front of the information processing apparatus 1, the information processing apparatus 1 can exclude the person from detection targets for the orientation of the face to prevent the face orientation from being falsely detected or becoming undetectable in order to prevent unintended control. Further, when the person is present in a position in which an actual face range is not suitable for the detected face range (for example, in a position too close to or too far from the information processing apparatus 1) even though the person is present in front of the information processing apparatus 1, the information processing apparatus 1 can exclude the person from detection targets for the orientation of the face to prevent the face orientation from being falsely detected or becoming undetectable in order to prevent unintended control.

Further, in the face range detection processing, the information processing apparatus 1 detects a range of a face of the person based on the shape of the edge of the person range detected in the detection range FoV.

Thus, the information processing apparatus 1 can detect a direction of the face using the measured distance values in the face range of the person among the measured distance values in the detection range FoV.

Further, the processor (for example, the CPU 301) included in the information processing apparatus 1 further performs screen brightness control processing. In the screen brightness control processing, the information processing apparatus 1 controls the screen brightness of the display unit 110 based on the orientation of the face detected by the face direction detection processing.

Thus, since the information processing apparatus 1 can reduce or turn off the screen brightness when the face of the user is not facing forward, power can be prevented from being wastefully consumed during a period when the user is not using the information processing apparatus 1.

Further, a control method for the information processing apparatus 1 according to the present embodiment includes: a person detection step of causing a processor (for example, the CPU 301, the chipset 303, or the like) to detect a range of a person present in the detection range FoV based on the measured distance value for each measurement unit; a face detection step of causing the processor to detect a range of a face of the person in the range of the person detected in the detection range FoV based on the measured distance value for each measurement unit; and a face direction detection step of causing the processor to detect the orientation of the face based on measured distance values in the range of the face among measured distance values each for each measurement unit.

Thus, since the information processing apparatus 1 detects the orientation of the face using the ToF sensor 130, the orientation of the face can be detected with a simple configuration. For example, in the conventional method of detecting the orientation of a face using a captured image captured by the camera, the load of development related to image recognition and the like for face detection is high, and power consumption is also high because it is necessary to capture images using the camera, while in the detection of the orientation of the face using the ToF sensor 130 according to the present embodiment, since the configuration is such a simple configuration as to perform detection by an algorithm using numerical processing of the measured distance values without the need to use the camera, the development cost can be reduced with low power consumption compared to the conventional method.

Second Embodiment

Next, a second embodiment of the present invention will be described.

In the first embodiment, the configuration to detect the orientation of the face using the ToF sensor 130 is described, but the orientation of a body may further be detected.

Figure 8A:
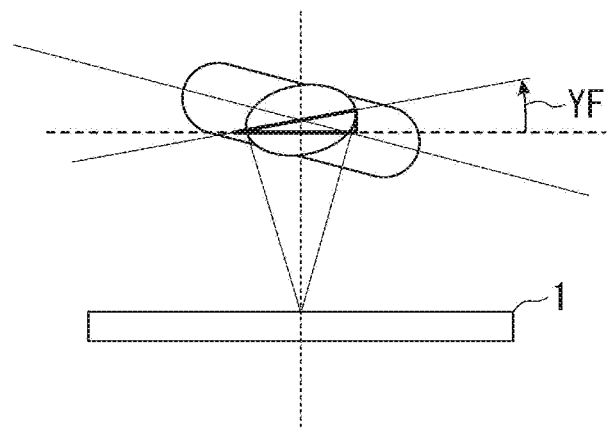
FIGS. 8A-8B are schematic diagrams illustrating the orientation of a face and the orientation of a body according to a second embodiment.
Figure 8B:
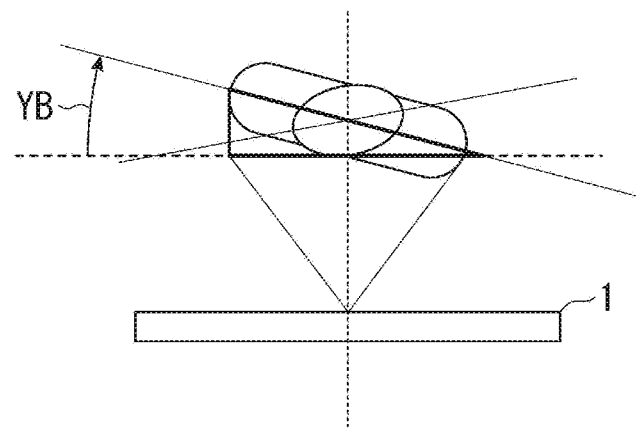

FIGS. 8A-8B are schematic diagrams illustrating the orientation of a face and the orientation of a body. FIG. 8A and FIG. 8B are schematic diagrams of the information processing apparatus 1 and a person (user) present in front of the information processing apparatus 1 when viewed from above. In FIG. 8A, the orientation of a face in the horizontal direction is indicated by arrow YF. Further, in FIG. 8B, the orientation of a body in the horizontal direction is indicated by arrow YB.

Figure 9:
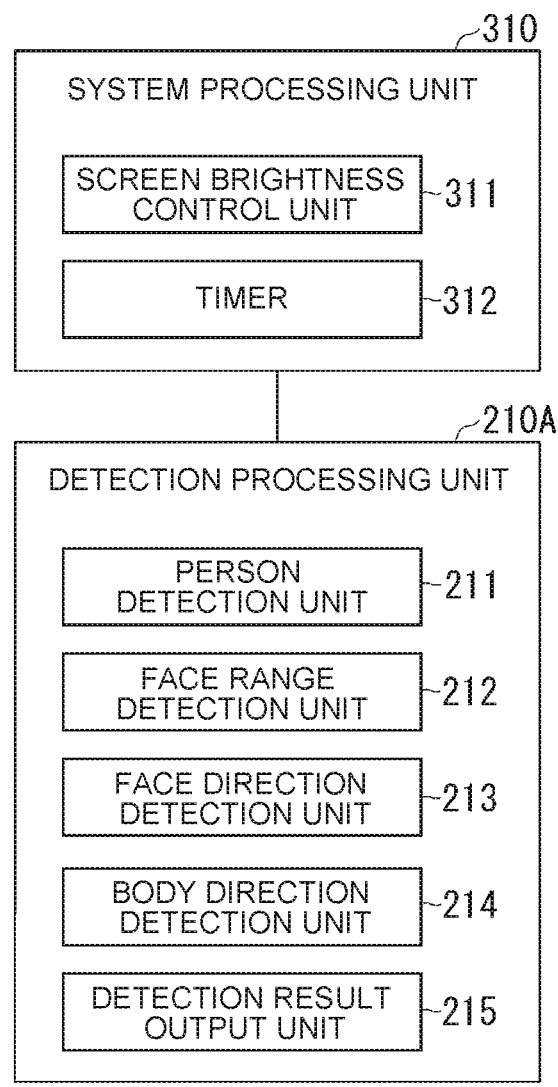
FIG. 9 is a schematic block diagram illustrating an example of the functional configuration of the information processing apparatus according to the second embodiment.

FIG. 9 is a schematic block diagram illustrating an example of the functional configuration of the information processing apparatus 1 according to the present embodiment. The illustrated functional configuration of the information processing apparatus 1 is different from that in FIG. 5 in the configuration of a detection processing unit 210A. The detection processing unit 210A includes the person detection unit 211, the face range detection unit 212, the face direction detection unit 213, a body direction detection unit 214, and the detection result output unit 215, which is different from the detection processing unit 210 illustrated in FIG. 5 in that the body direction detection unit 214 is further included.

The body direction detection unit 214 performs body direction detection processing to detect the orientation of a body based on measured distance values in a range of at least part of the body among the measured distance values respectively for the plural squares (measurement units) illustrated in FIG. 3. Here, the range of at least part of the body is, for example, the range of shoulders (see FIG. 3) detected when the face range detection unit 212 detects the range of the face. In other words, the face range detection unit 212 performs body detection processing to detect the range of the shoulders as the range of at least part of the body based on the shape of the edge of the person range. Then, the body direction detection unit 214 detects the orientation of the body based on the measured distance values in the range of shoulders.

For example, the body direction detection unit 214 detects the orientation of the body based on a difference between measured distance values of both ends of the plural squares (measurement units) in the range of shoulders. Specifically, the body direction detection unit 214 detects the orientation of the body based on a difference between the measured distance value in the square marked with SL in FIG. 3 (that is, the shoulder on the left side, which is the right shoulder of the person to be detected) and the measured distance value in the square marked with SR (that is, the shoulder on the right side, which is the left shoulder of the person to be detected).

As an example, when the difference between the measured distance value in the square marked with SL and the measured distance value in the square marked with SR is less than a predetermined threshold value, the body direction detection unit 214 determines that the body is facing forward. Further, when the difference between the measured distance value in the square marked with SL and the measured distance value in the square marked with SR is the predetermined threshold value or more, and the measured distance value in the square marked with SL is smaller than the measured distance value in the square marked with SR, the body direction detection unit 214 determines that the orientation of the body is rightward. On the other hand, when the difference between the measured distance value in the square marked with SL and the measured distance value in the square marked with SR is the predetermined threshold value or more, and the measured distance value in the square marked with SR is smaller than the measured distance value in the square marked with SL, the body direction detection unit 214 determines that the orientation of the body is leftward. Thus, the body direction detection unit 214 determines that the orientation of the body is leftward, rightward, or forward based on the measured distance value in the square marked with SL and the measured distance value in the square marked with SR to detect the orientation of the body.

Based on the orientation of the body detected by the body direction detection unit 214, the screen brightness control unit 311 changes part of the control of the screen brightness in the screen brightness control processing. For example, when the body is facing forward, the screen brightness is controlled according to the orientation of the face like in the first embodiment, while when the body is not facing forward, the screen brightness will not have to be controlled to the low brightness even if the orientation of the face changes from forward to sideways. For example, when the orientation of the face is not forward but the body is facing forward, the detection result output unit 215 outputs the "No Attention" information to the system processing unit 310. On the other hand, even when the orientation of the face is not forward, if the body is also not facing forward, the detection result output unit 215 may output the "Attention" information to the system processing unit 310.

Further, even when the orientation of the face is not forward and the body is not facing forward, the detection result output unit 215 may output the "No Attention" information to the system processing unit 310, but in this case, the screen brightness control unit 311 may be instructed to change the waiting time until the screen brightness is controlled to the low brightness to be longer than that when the body is facing forward.

Figure 10:
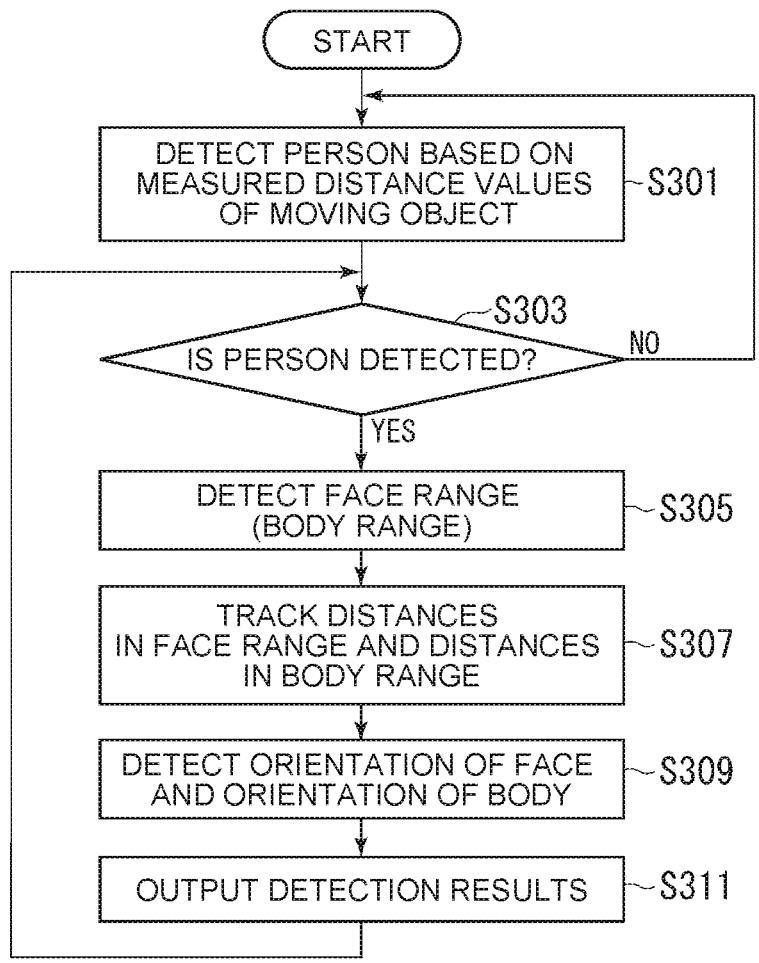
FIG. 10 is a flowchart illustrating an example of face direction and body direction detection processing according to the second embodiment.

FIG. 10 is a flowchart illustrating an example of face direction and body direction detection processing according to the present embodiment. Respective processes of step S301, step S303, and step S305 illustrated in FIG. 10 are similar to the respective processes of step S101, step S103, and step S105 illustrated in FIG. 6, and the description thereof will be omitted. Note that the detection processing unit 210 detects the range of a face and the range of a body in step S305 illustrated in FIG. 10, but since the range of shoulders (that is, the range of a body) is detected when the range of a face is detected even in step S103 illustrated in FIG. 6, both are similar processes.

(Step S307) The detection processing unit 210 tracks distances in the range of the face and distances in the range of the body (the range of shoulders) detected to acquire measured distance values in the range of the face and the range of the body. Then, the detection processing unit 210 proceeds to a process in step S309.

(Step S309) The detection processing unit 210 performs face direction detection processing to detect the orientation of the face based on the measured distance values in the range of the face acquired in step S307, and body direction detection processing to detect the orientation of the body based on the measured distance values in the range of the body (the range of shoulders) acquired in step S307. Then, the detection processing unit 210 proceeds to a process in step S311.

(Step S311) The detection processing unit 210 outputs information based on the orientation of the face and the orientation of the body detected in step S309 to the system processing unit 310 as the detection results. For example, when the detected orientation of the face is forward, the detection processing unit 210 outputs the "Attention" information to the system processing unit 310. On the other hand, when the detected orientation of the face is not forward but the body is facing forward, the detection processing unit 210 outputs the "No Attention" information to the system processing unit 310, while when the body is also not facing forward, the detection processing unit 210 outputs the "Attention" information to the system processing unit 310.

Note that even when the orientation of the face is not forward and the body is not facing forward, the detection processing unit 210 may output the "No Attention" information to the system processing unit 310, but in this case, information to give an instruction to change the waiting time until the screen brightness is controlled to the low brightness to be longer than that when the body is facing forward may also be input to the system processing unit 310 together with the "No Attention" information.

Thus, the processor (for example, the CPU 301, the chipset 303, or the like) included in the information processing apparatus 1 according to the present embodiment performs the body detection processing to detect a range of at least part of the body (for example, shoulders) of the person detected in the detection range FoV based on pieces of distance information each piece for each measurement unit, and the body direction detection processing to detect the orientation of the body based on measured distance values (the example of distance information) in a range of at least part of the body (for example, shoulders) among the pieces of distance information each piece for each measurement unit.

Thus, the information processing apparatus 1 can detect not only the orientation of the face of the person present in front of the information processing apparatus 1, but also the orientation of the body with a simple configuration using the ToF sensor 130. Therefore, the information processing apparatus 1 can perform control by taking both the orientation of the face and the orientation of the body into consideration.

For example, the processor (for example, the CPU 301) included in the information processing apparatus 1 further performs screen brightness control processing. In the screen brightness control processing, the information processing apparatus 1 controls the screen brightness of the display unit 110 based on the orientation of the face detected by the face direction detection processing and the orientation of the body detected by the body direction detection processing.

Thus, the information processing apparatus 1 can control the screen brightness by taking both the orientation of the face and the orientation of the body into consideration. For example, when the orientation of the face is not forward but the body is facing forward, the information processing apparatus 1 determines that the user is not using the information processing apparatus 1, and after the predetermined waiting time has elapsed, the information processing apparatus 1 reduces the screen brightness. On the other hand, when both the body and the face are facing the same direction (when both are not facing forward), since it can also be considered that a second monitor is connected and used, the waiting time until the screen brightness is reduced may be made longer or the screen brightness is kept as the standard brightness.

While the embodiments of this invention have been described in detail above with reference to the accompanying drawings, the specific configurations are not limited to those in the embodiments described above, and design changes are also included without departing from the scope of this invention. For example, the respective components described in the above embodiments can be combined arbitrarily.

Further, in the aforementioned embodiments, the information processing apparatus 1 detects the orientation of the face using the measured distance values in four squares of the top part, bottom part, left part, and right part of the face in the range of the face within the detection range FoV, but the orientation of the face (upward, downward, or forward) may be detected using the measured distance values in two squires of the top part and the bottom part of the face, or the orientation of the face (leftward, rightward, or forward) may be detected using the measured distance values in two squares of the left part and the right part of the face.

Further, the information processing apparatus 1 may detect the orientation of the face using measured distance values in five squares or more in the range of the face (for example, 3×4 squares or 3×3 squares) within the detection range FoV. For example, the information processing apparatus 1 may detect the orientation of the face using measured distance values in five squares of the center, top part, bottom part, left part, and right part of the face in the range of the face within the detection range FoV. Further, the information processing apparatus 1 may detect the orientation of the face using measured distance values in eight squares around the center of the face in the range of the face within the detection range FoV, or may detect the orientation of the face using measured distance values in nine squares with the measured distance value of the center of the face further added.

Further, in the aforementioned embodiments, the configuration example in which the ToF sensor 130 is built in the information processing apparatus 1 is described, but the present invention is not limited to this example. For example, the ToF sensor 130 does not have to be built in the information processing apparatus 1, which may also be attachable to the information processing apparatus 1 (for example, onto any one of the side faces 10*a*, 10*b*, 10*c*, and the like) and communicably connected to the information processing apparatus 1 wirelessly or by wire as an external accessory of the information processing apparatus 1.

Further, a hibernation state, a power-off state, and the like may be included as the standby state described above. The hibernation state corresponds, for example, to S4 state defined in the ACPI specification. The power-off state corresponds, for example, to S5 state (shutdown state) defined in the ACPI specification. Note that the standby state, the sleep state, the hibernation state, the power-off state, and the like as the standby state are states lower in power consumption than the normal operating state (states of reducing power consumption).

Note that the information processing apparatus 1 described above has a computer system therein. Then, a program for implementing the function of each component included in the information processing apparatus 1 described above may be recorded on a computer-readable recording medium so that the program recorded on this recording medium is read into the computer system and executed to perform processing in each component included in the information processing apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The abovementioned program may also be to implement some of the functions described above. Further, the program may be a so-called differential file (differential program) capable of implementing the above-described functions in combination with a program(s) already recorded in the computer system.

Further, some or all of the functions of the information processing apparatus 1 in the embodiments described above may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the information processing apparatus 1 of the embodiments mentioned above is not limited to the laptop PC, which may be, for example, a desktop PC, a tablet terminal device, a smartphone, a game console, a multimedia terminal, or the like.

DESCRIPTION OF SYMBOLS

1 information processing apparatus
10 first chassis
20 second chassis
15 hinge mechanism
110 display unit
130 ToF sensor
140 power button
150 input device
151 keyboard
153 touch pad
160 communication unit
170 storage unit
200 EC
210 detection processing unit
211 person detection unit
212 face range detection unit 213 face direction detection unit
214 body direction detection unit
215 detection result output unit
300 main processing unit
301 CPU
302 GPU
303 chipset
304 system memory
310 system processing unit
311 screen brightness control unit
312 timer
400 power supply unit

What is claimed is:

1. An information processing apparatus comprising:
a ranging sensor which divides a predetermined detection range into a plurality of measurement units to measure a distance from the ranging sensor to an object for each of the plurality of measurement units;
a memory which temporarily stores distance information indicative of the distance for each of the plurality of measurement units measured by the ranging sensor; and
a processor which executes processing based on the distance information for each of the plurality of measurement units, wherein
the processor performs:
  person detection processing to detect a range of a person present in the detection range based on the distance information for each of the measurement units,
  face range detection processing to detect a range of a face of the person in the range of the person detected in the detection range based on the distance information for each of the measurement units, and
  face direction detection processing to detect an orientation of the face based on distance information in the range of the face among pieces of the distance information each piece for each of the measurement units, wherein
  in the face direction detection processing, the processor detects the orientation of the face based on differences among pieces of the distance information each piece for each of a plurality of measurement units in the range of the face, and
  in the face direction detection processing, the processor detects the orientation of the face in a horizontal direction corresponding to a direction of rotation with a vertical axis passing through a center of the face as a central axis, and the orientation of the face in a vertical direction corresponding to a direction of rotation with a horizontal axis passing through the center of the face as the central axis.

2. An information processing apparatus comprising:
a ranging sensor which divides a predetermined detection range into a plurality of measurement units to measure a distance from the ranging sensor to an object for each of the plurality of measurement units;
a memory which temporarily stores distance information indicative of the distance for each of the plurality of measurement units measured by the ranging sensor; and
a processor which executes processing based on the distance information for each of the plurality of measurement units, wherein
the processor performs:
  person detection processing to detect a range of a person present in the detection range based on the distance information for each of the measurement units,
  face range detection processing to detect a range of a face of the person in the range of the person detected in the detection range based on the distance information for each of the measurement units, and
  face direction detection processing to detect an orientation of the face based on distance information in the range of the face among pieces of the distance information each piece for each of the measurement units, wherein
  in the face direction detection processing, the processor detects the orientation of the face based on differences among pieces of the distance information each piece for each of a plurality of measurement units in the range of the face,
  in the person detection processing, the processor calculates an average distance to the person based on distance information in the range of the person detected in the detection range among pieces of the distance information each piece for each of the measurement units, and
  in the face direction detection processing, the processor detects the orientation of the face based on the average distance calculated by the person detection processing and pieces of the distance information each piece for each of the plurality of measurement units in the range of the face.

3. An information processing apparatus comprising:
a ranging sensor which divides a predetermined detection range into a plurality of measurement units to measure a distance from the ranging sensor to an object for each of the plurality of measurement units;
a memory which temporarily stores distance information indicative of the distance for each of the plurality of measurement units measured by the ranging sensor; and
a processor which executes processing based on the distance information for each of the plurality of measurement units, wherein
the processor performs:
  person detection processing to detect a range of a person present in the detection range based on the distance information for each of the measurement units,
  face range detection processing to detect a range of a face of the person in the range of the person detected in the detection range based on the distance information for each of the measurement units, and
  face direction detection processing to detect an orientation of the face based on distance information in the range of the face among pieces of the distance information each piece for each of the measurement units, wherein
  in the person detection processing, the processor calculates an average distance to the person based on distance information in the range of the person detected in the detection range among pieces of the distance information each piece for each of the measurement units, and
  the processor controls whether or not to execute the face direction detection processing based on the average distance calculated by the person detection processing.

4. The information processing apparatus according to claim 3, wherein in the face range detection processing, the processor detects the range of the face of the person based on a shape of an edge of the range of the person detected in the detection range.

5. The information processing apparatus according to claim 3, wherein the processor performs screen brightness control processing to control screen brightness of a display unit based on the orientation of the face detected by the face direction detection processing.

6. The information processing apparatus according to claim 3, wherein the processor further performs:
   body detection processing to detect a range of at least part of a body of the person in the range of the person detected in the detection range based on the distance information for each of the measurement units, and
   body direction detection processing to detect an orientation of the body based on distance information in the range of at least part of the body among the pieces of the distance information each piece for each of the measurement units.

7. The information processing apparatus according to claim 6, wherein the processor performs screen brightness control processing to control screen brightness of a display unit based on the orientation of the face detected by the face direction detection processing and the orientation of the body detected by the body direction detection processing.

\* \* \* \* \*